Sept. 30, 1969   D. A. LINWOOD   3,469,854
HEADER RING
Filed Nov. 4, 1966

INVENTOR
DEREK ARTHUR LINWOOD
BY: Jacobs & Jacobs
ATTORNEYS

United States Patent Office 3,469,854
Patented Sept. 30, 1969

3,469,854
HEADER RING
Derek Arthur Linwood, Hampton, England, assignor to Hall & Hall Limited, Hampton, Middlesex, England, a company of Great Britain and Northern Ireland
Filed Nov. 4, 1966, Ser. No. 592,130
Int. Cl. F16j 15/16, 15/48, 15/32
U.S. Cl. 277—124                                  2 Claims

ABSTRACT OF THE DISCLOSURE

A header ring for use with V-ring assemblies is provided of unitary construction and is made up of two portions, one being a header member and the other a body member. Both are of elastomeric material but the body member is harder than the header member. The base of the body member is specially adapted so as to be of a convex shape which can be received in the concave face of a V-ring. When thus positioned, the header ring and its adjacent V-ring form a packing assembly in which the header ring itself has a sealing action.

---

This invention relates to header rings for "V-ring" assemblies. A "V-ring" assembly is a packing of one or more sealing rings of Chevron cross-section, placed between relatively movable parts of a hydraulic apparatus for sealing purposes.

Sealing must be efficient but must not involve undue friction or wear on the assembly and is preferably proportional in effect to the pressure (hydraulic or mechanical) exerted in the axial direction of the assembly.

It is advantageous to provide a header element at the higher pressure side of the assembly, to prevent undue flattening of the nearmost V-ring under pressure. It is the object of the invention to provide a header element in the form of a separate header ring which has especially advantageous characteristics under pressure, and which itself can act as a sealing ring.

According to the present invention I provide a header ring for a "V-ring" assembly, the said ring having an annular body member and a heading member both of rubber-like material formed integral with each other or bonded together throughout their contacting surfaces wherein the body member has a convex base including two frusto-conical annular surfaces for fitting the concave surface of an adjacent member of a "V-ring" assembly, the heading member being formed of a material more readily deformable than that of the body member.

The invention includes a "V-ring" assembly incoporating such a header ring.

Figure 1:
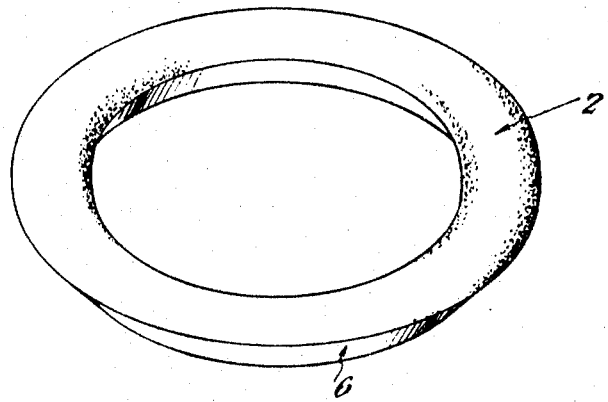
Figure 2:
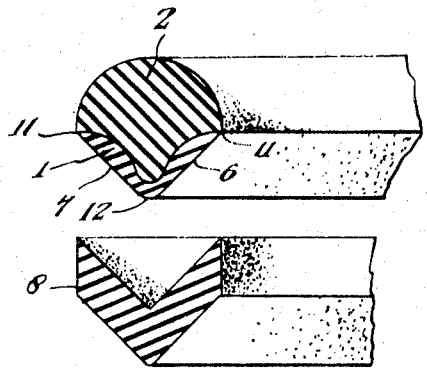
Figure 3:
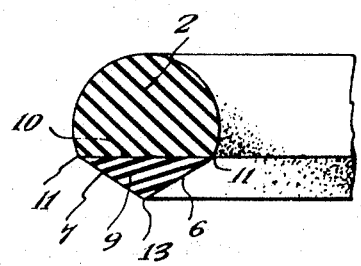

Particular embodiments of the invention will now be described with reference to the accompanying drawings wherein:

FIGURE 1 is a perspective view of one form of ring embodying the present invention, FIGURE 2 is a transverse diametrical section of the ring shown in FIGURE 1, and positioned above a "V-ring," and FIGURE 3 is a transverse diametrical section similar to FIGURE 2 of a second embodiment of the invention.

As will be seen from FIGURES 1 and 2 the header ring comprises a circular annular channel shaped body member 1 in which is disposed a heading member 2, the base of the body member being convex and including two conical surfaces 6 and 7 at an angle such as to match the V-section concave upper surface of an adjacent ring 8 of a V-ring assembly, as shown in exploded relation in FIGURE 2. The heading member 2 which is of more readily deformable material than the body member 1, has a convex upper surface and its undersurface matches and is bonded throughout its whole area to the concave surface of the body member 1.

When positioned for use, pressure of fluid or of the end wall of a housing presses the base of the header ring into the next ring 8 of the assembly, but in contrast to known "V-ring" assemblies the header ring also functions as a sealing ring: the heading member being more deformable than the body distributes pressure to the body to urge it outwardly into sealing engagement with the walls packed; the body member being harder than the heading member can resist the wear this engagement entails.

In the present arrangement the greatest radial thickness of the ring is at the lips 11 at the uppermost ends of the surfaces 6 and 7. The surfaces 6 and 7 meet symmetrically, at the line of mean radial thickness of the ring, at a rounded ridge 12.

In FIGURE 3 the body member 9 includes two conical annular surfaces 6, 7 as before, but they meet at an angular ridge 13, and the body member 9 is bonded to the heading member 2 on a planar interface 10. The greatest radial thickness of the ring is above the lips 11 of the body member.

The shape into which the non-bonded surface of the heading member 2 is formed is adaptable according to the use envisaged for the particular ring, but that surface of the heading member 2 will always be convex or planar adjacent where it meets the body member.

The body and heading members have here been formed separately of rubber and reinforced rubber and subsequently bonded together—but they could be made in one together of the same material, one part, to form the body member, being reinforced.

I claim:

1. A packing assembly including a V-ring having a concave face and a unitary header ring having a convex base positioned in the concave face of the V-ring, the convex base of the header ring being in substantially face to face contact with the surfaces of the concave face of the V-ring; the header ring having a heading member and a body member both of elastomeric material, the body member providing the said convex base and being of a material harder than the material of the heading member.

2. A packing assembly according to claim 1 wherein the base of the header ring has inner and outer peripheral edges and the header ring has a plane at which the radical thickness is maximum and the body member terminates at the inner and outer peripheral edges of the base and at the plane of maximum radial thickness of the header ring in thin lips having at their extremities the same radii as the radial peripheries of the V-ring.

References Cited

UNITED STATES PATENTS

| 2,264,147 | 11/1941 | Dunlevy | 277—205 X |
| 2,318,486 | 5/1943 | Hoover | 277—124 |
| 2,755,118 | 7/1956 | Jarvis | 277—227 |

LAVERNE D. GEIGER, Primary Examiner

JEFFREY S. MEDNICK, Assistant Examiner

U.S. Cl. X.R.
277—125, 205, 212, 227